(12) United States Patent
Etsunagi et al.

(10) Patent No.: US 11,056,806 B2
(45) Date of Patent: Jul. 6, 2021

(54) HOUSING DEVICE FOR STORAGE BATTERY HOUSING

(71) Applicant: HONDA MOTOR CO., LTD., Tokyo (JP)

(72) Inventors: Kenichi Etsunagi, Saitama (JP); Ryo Oshima, Saitama (JP); Tomoyuki Koketsu, Saitama (JP); Michihito Okado, Saitama (JP); Takumi Shiiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/562,458

(22) Filed: Sep. 6, 2019

(65) Prior Publication Data
US 2019/0393627 A1 Dec. 26, 2019

Related U.S. Application Data

(63) Continuation of application No. PCT/JP2018/011553, filed on Mar. 22, 2018.

(30) Foreign Application Priority Data

Mar. 24, 2017 (JP) ............................. JP2017-059355

(51) Int. Cl.
*B60R 16/04* (2006.01)
*H01R 9/28* (2006.01)
(Continued)

(52) U.S. Cl.
CPC .............. *H01R 9/28* (2013.01); *H01M 10/44* (2013.01); *H01M 50/20* (2021.01); *B60L 50/64* (2019.02); *B62J 43/00* (2020.02)

(58) Field of Classification Search
CPC .... B60S 5/06; B60S 5/00; B60L 53/80; B60L 53/00; B60L 53/30; B60L 53/31;
(Continued)

(56) References Cited

U.S. PATENT DOCUMENTS 4,413,219 A * 11/1983 Ducharme .......... H01M 2/1077
320/109
4,450,400 A * 5/1984 Gwyn ..................... B60L 50/66
320/109
(Continued)

FOREIGN PATENT DOCUMENTS

JP S609055 A 1/1985
JP S60165047 A 8/1985
(Continued)

OTHER PUBLICATIONS

International Search Report and (ISA/237) Written Opinion of the International Search Authority for International Patent Application No. PCT/JP2018/011553, mailed by the Japan Patent Office dated May 29, 2018.
(Continued)

*Primary Examiner* — James M Dolak

(57) ABSTRACT

A housing device is provided which houses a storage battery having a first connector. The housing device may include a storage battery holding part which holds a storage battery and a drive part which (i) moves a second connector that is to be connected to the first connector of the storage battery toward the first connector and/or (ii) moves a second connector that has been connected to the first connector of the storage battery in a direction away from the first connector.

18 Claims, 13 Drawing Sheets

(51) Int. Cl.
*H01M 10/44* (2006.01)
*H01M 50/20* (2021.01)
*B60L 50/64* (2019.01)
*B62J 43/00* (2020.01)

(58) Field of Classification Search
CPC .......... B60L 53/50; B60L 53/53; B60L 53/57;
B60L 53/60; B60L 53/67; B60L 50/50;
B60L 50/00; B60L 50/60; B60K 1/04;
B60K 2001/0494; B60K 2001/0455;
B60K 2001/0488; H01M 2/1077; H01M
2/1072; H01M 2/1083; H01M 2/1016;
H01M 2/1027; H01M 2/10; H01M 10/46;
H01M 2220/20
See application file for complete search history.

(56) References Cited

U.S. PATENT DOCUMENTS

| | | | | |
|---|---|---|---|---|
| 5,091,687 | A * | 2/1992 | Meyer | B60L 53/80 320/109 |
| 5,425,159 | A * | 6/1995 | Kluttermann | B65H 67/0428 104/34 |
| 5,612,606 | A * | 3/1997 | Guimarin | B60L 53/80 320/109 |
| 5,668,460 | A * | 9/1997 | Lashlee | H01M 10/441 320/109 |
| 5,998,963 | A * | 12/1999 | Aarseth | B60L 53/65 320/109 |
| 6,371,230 | B1 * | 4/2002 | Ciarla | B60L 53/80 180/68.5 |
| 6,498,457 | B1 * | 12/2002 | Tsuboi | B60L 50/64 320/110 |
| 6,936,372 | B1 * | 8/2005 | Jagota | H01M 2/1077 429/50 |
| 6,938,553 | B2 * | 9/2005 | Tamaki | B61C 17/06 104/34 |
| 7,004,710 | B1 * | 2/2006 | Quade | H01M 10/42 414/395 |
| 7,520,355 | B2 * | 4/2009 | Chaney | B60L 53/80 180/68.5 |
| 7,712,563 | B2 * | 5/2010 | Niebuhr | B66F 9/0754 180/68.5 |
| 8,006,793 | B2 * | 8/2011 | Heichal | B60K 1/04 180/68.5 |
| 8,376,076 | B2 * | 2/2013 | Kataoka | B61C 17/00 180/68.5 |
| 8,461,804 | B1 * | 6/2013 | Capizzo | B60L 53/60 320/109 |
| 8,825,202 | B2 * | 9/2014 | Yu | B60L 53/36 700/228 |
| 8,859,127 | B2 * | 10/2014 | Han | H01M 2/1077 429/120 |
| 9,187,004 | B1 * | 11/2015 | Davis | B60L 53/30 |
| 9,227,601 | B2 * | 1/2016 | Corfitsen | B60S 5/06 |
| 9,238,414 | B2 * | 1/2016 | Ryberg | B60L 53/80 |
| 9,352,728 | B2 * | 5/2016 | Corfitsen | B60K 1/04 |
| 9,461,344 | B2 * | 10/2016 | Lee | H01M 10/613 |
| 9,821,959 | B2 * | 11/2017 | Hognaland | H02J 7/0027 |
| 9,825,344 | B2 * | 11/2017 | Nakahama | H01M 10/613 |
| 9,827,840 | B2 * | 11/2017 | Wen | B60K 1/04 |
| 9,827,865 | B2 * | 11/2017 | Zhou | B60L 11/1822 |
| 9,834,183 | B2 * | 12/2017 | Moskowitz | B60S 5/06 |
| 9,873,408 | B2 * | 1/2018 | Capizzo | B60L 53/36 |
| 9,873,409 | B2 * | 1/2018 | Corfitsen | B65G 47/57 |
| 9,987,938 | B2 * | 6/2018 | Salasoo | H02J 7/0045 |
| 10,014,701 | B2 * | 7/2018 | Toya | H02J 7/0047 |
| 10,040,359 | B2 * | 8/2018 | Chen | G07F 7/06 |
| 10,055,911 | B2 | 8/2018 | Luke | |
| 10,065,525 | B2 | 9/2018 | Chen | |
| 10,112,471 | B2 * | 10/2018 | Higuchi | B60K 1/04 |
| 10,158,102 | B2 | 12/2018 | Wu | |
| 10,186,094 | B2 | 1/2019 | Wu | |
| 10,209,090 | B2 | 2/2019 | Luke | |
| 10,345,843 | B2 | 7/2019 | Luke | |
| 10,600,116 | B2 * | 3/2020 | Takatsuka | B60L 50/50 |
| 10,658,636 | B2 * | 5/2020 | Geshi | H01M 10/6563 |
| 10,688,876 | B2 * | 6/2020 | Takatsuka | B60L 53/50 |
| 10,727,548 | B2 * | 7/2020 | Park | H01M 10/627 |
| 10,753,761 | B2 * | 8/2020 | Ricci | B60L 53/55 |
| 10,819,126 | B2 * | 10/2020 | Hognaland | B65G 1/0492 |
| 10,840,569 | B2 * | 11/2020 | Hasegawa | H01G 11/10 |
| 10,840,719 | B2 * | 11/2020 | Matsumoto | H01M 10/441 |
| 10,875,506 | B2 * | 12/2020 | Koketsu | B60L 50/50 |
| 10,899,369 | B2 * | 1/2021 | Shooter | B61F 1/00 |
| 10,916,953 | B2 * | 2/2021 | Reber | H02J 7/0042 |
| 2010/0292877 | A1 * | 11/2010 | Lee | B60K 1/04 701/21 |
| 2011/0024207 | A1 * | 2/2011 | Higashino | H01M 10/625 180/65.1 |
| 2013/0026971 | A1 | 1/2013 | Luke | |
| 2013/0030580 | A1 | 1/2013 | Luke | |
| 2013/0030581 | A1 | 1/2013 | Luke | |
| 2013/0030608 | A1 | 1/2013 | Taylor | |
| 2013/0030630 | A1 | 1/2013 | Luke | |
| 2013/0030920 | A1 | 1/2013 | Wu | |
| 2013/0033203 | A1 | 2/2013 | Luke | |
| 2013/0116892 | A1 | 5/2013 | Wu | |
| 2014/0142786 | A1 | 5/2014 | Huang | |
| 2014/0251710 | A1 | 9/2014 | Juan | |
| 2014/0253021 | A1 | 9/2014 | Luke | |
| 2014/0266006 | A1 | 9/2014 | Luke | |
| 2014/0277844 | A1 | 9/2014 | Luke | |
| 2014/0279576 | A1 | 9/2014 | Luke | |
| 2015/0042157 | A1 | 2/2015 | Chen | |
| 2016/0268822 | A1 | 9/2016 | Toya | |

FOREIGN PATENT DOCUMENTS

| | | |
|---|---|---|
| JP | H0295161 U | 7/1990 |
| JP | H0613352 U | 2/1994 |
| JP | 2005174681 A | 6/2005 |
| JP | 2014525229 A | 9/2014 |
| JP | 2014525230 A | 9/2014 |
| JP | 2014525231 A | 9/2014 |
| JP | 2014527390 A | 10/2014 |
| JP | 2014527689 A | 10/2014 |
| JP | 2014529117 A | 10/2014 |
| JP | 2014529118 A | 10/2014 |
| JP | 2014529119 A | 10/2014 |
| JP | 2014529392 A | 11/2014 |
| JP | 2014529982 A | 11/2014 |
| JP | 2014531699 A | 11/2014 |
| JP | 2014533480 A | 12/2014 |
| JP | 2015502881 A | 1/2015 |
| JP | 2015231837 A | 12/2015 |
| JP | 2015534927 A | 12/2015 |
| JP | 2016514357 A | 5/2016 |
| JP | 2016515063 A | 5/2016 |
| JP | 2016517257 A | 6/2016 |
| JP | 2016521389 A | 7/2016 |
| JP | 2016521393 A | 7/2016 |
| JP | 2016527871 A | 9/2016 |
| JP | 2016533154 A | 10/2016 |
| JP | 2016534518 A | 11/2016 |
| JP | 2017073838 A | 4/2017 |

OTHER PUBLICATIONS

Decision to Grant a Patent issued for counterpart Japanese Application No. 2017-059355, drafted by the Japan Patent Office dated Jan. 16, 2018.

Extended European Search Report for counterpart European Application No. 18771304.5, issued by the European Patent Office dated Jan. 14, 2020.

* cited by examiner

HOUSING DEVICE FOR STORAGE BATTERY HOUSING

CROSS REFERENCE TO RELATED APPLICATION

This is a continuation application of International Application No. PCT/JP2018/011553 filed on Mar. 22, 2018, which claims priority to Japanese Patent Application No. 2017-059355 filed in JP on Mar. 24, 2017, the contents of each of which are incorporated herein by reference.

BACKGROUND

1. Technical Field

The present invention relates to a housing device.

2. Related Art

For example, a charging station is known which houses a storage battery for electric motorcycles and provides a user of an electric motorcycle with a fully-charged storage battery (for example, see Patent Literature 1).

Patent Literature 1: Japanese Translation of PCT International Application No. 2016-514357

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Figure 1:
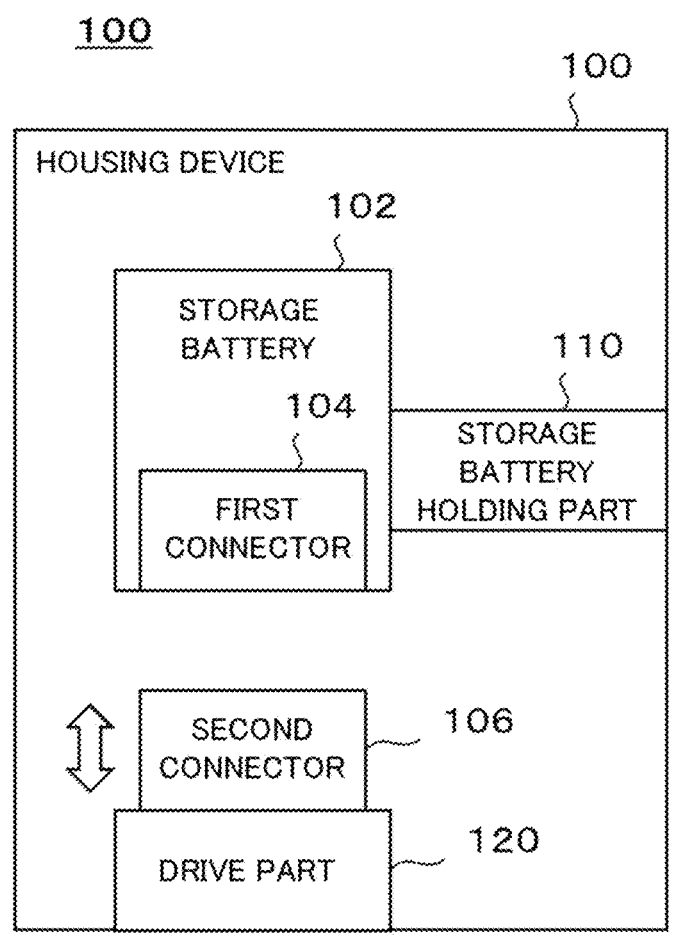
FIG. 1 schematically illustrates one example of a system configuration of a housing device 100.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. In the drawings, the same or similar parts may be denoted by the same reference sign, and the redundant description may not be repeated.

[Outline of Housing Device 100]

FIG. 1 schematically illustrates one example of a system configuration of a housing device 100. In this embodiment, the housing device 100 houses one or more storage batteries 102. For example, the storage battery 102 may include a first connector 104. For example, the housing device 100 includes a storage battery holding part 110. For example, the housing device 100 includes a drive part 120.

In this embodiment, the storage battery holding part 110 may hold the storage battery 102. The drive part 120 moves a second connector 106. The second connector 106 may be a connector to be connected to the first connector 104. The second connector 106 may be a connector already connected to the first connector 104. In this embodiment, for example, the drive part 120 moves the second connector 106 that is to be connected to the first connector 104 toward the first connector 104. For example, the drive part 120 moves the second connector 106 that has been connected to the first connector 104 in a direction away from the first connector 104.

For example, to house the storage battery 102 in the storage battery holding part 110, the user may utilize the mass of the storage battery 102 to connect the first connector 104 and the second connector 106, or the user may firmly push the storage battery 102 to connect the first connector 104 and the second connector 106. However, in these manners, at least one of the first connector 104 and the second connector 106 may be damaged by the mass of the storage battery 102 or the force applied to the storage battery holding part 110. In addition, in a case where an insertion load and an pull-out load of the first connector 104 and the second connector 106, it may be inconvenience for the user, or an action of the user may contribute to the breakage of the first connector 104 and the second connector 106.

On the other hand, according to this embodiment, while the storage battery 102 is held by the storage battery holding part 110, the first connector 104 and the second connector 106 are connected or separated when the drive part 120 moves the second connector 106. For example, according to this embodiment, during a period until the first connector 104 and the second connector 106 are connected after the storage battery 102 is held at a holding position of the storage battery holding part 110, the change rate of the relative position of the first connector 104 and the second connector 106 is larger than the change rate of the relative position of the first connector 104 and the storage battery holding part 110. In addition, during a period until the connected first connector 104 and second connector 106 are separated, the change rate of the relative position of the first connector 104 and the second connector 106 is larger than the change rate of the relative position of the first connector 104 and the storage battery holding part 110.

Accordingly, according to one embodiment, the breakage of the first connector 104 or the second connector 106 is suppressed. According to another embodiment, even in a case where the insertion load and/or the pull-out load of the first connector 104 and the second connector 106 are large, the load on the user is reduced. As a result, the convenience of the user is improved. In addition, it is possible to prevent the user from forcibly inserting or pulling out the storage battery 102.

Figure 2:
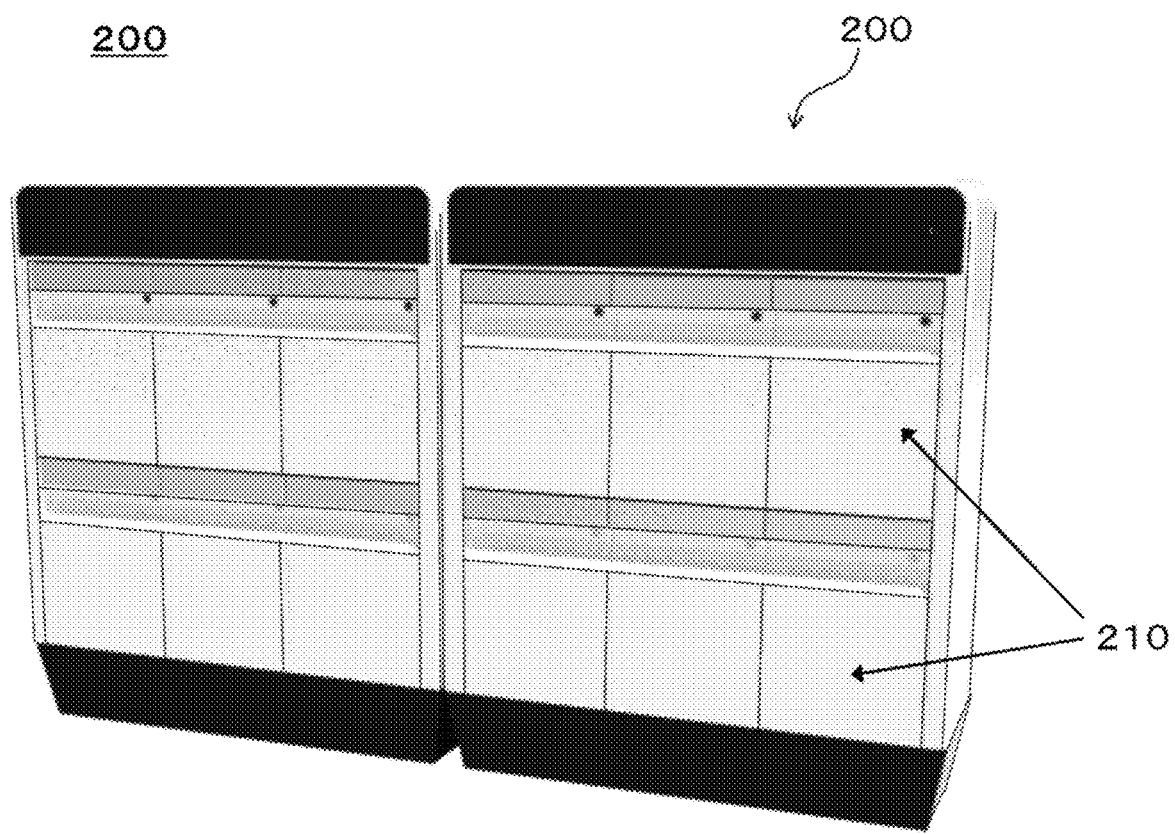
FIG. 2 schematically illustrates one example of an appearance of a battery station 200.
Figure 3:
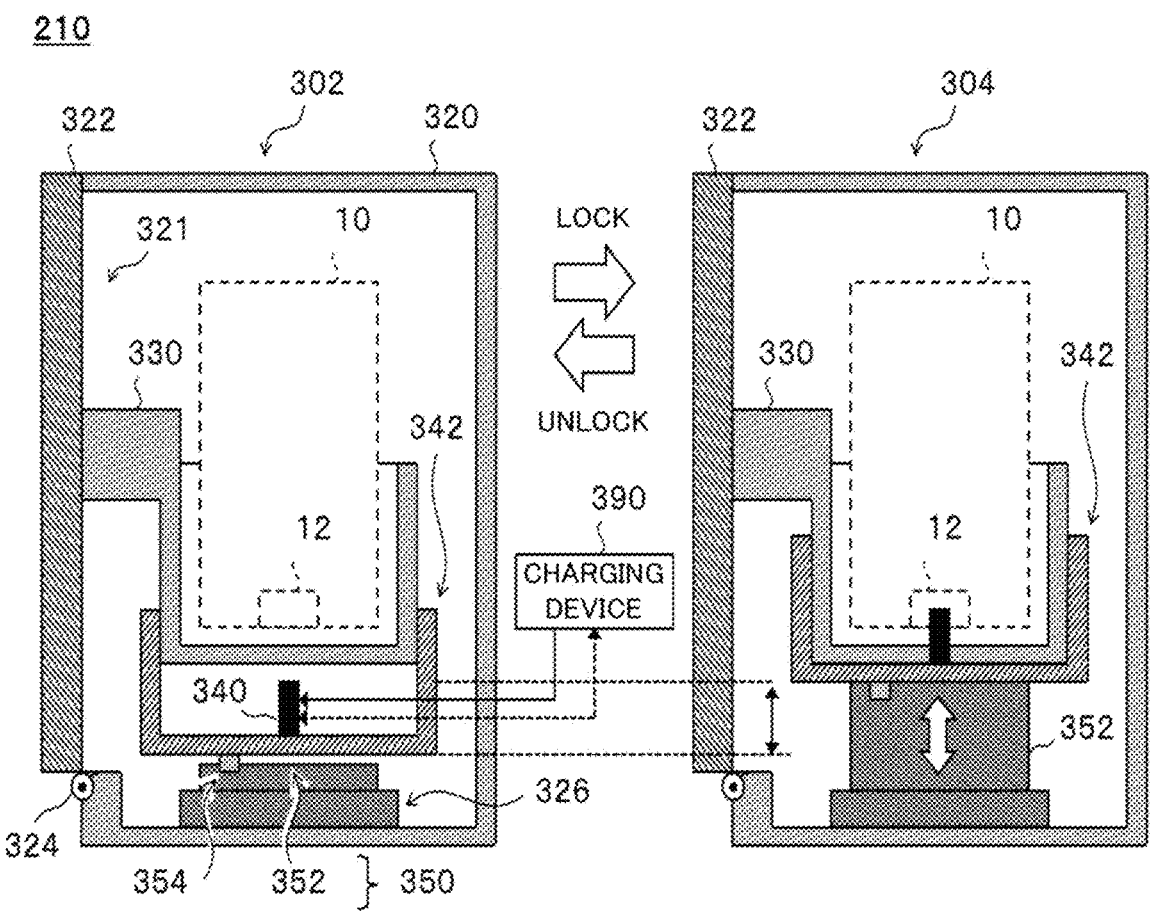
FIG. 3 schematically illustrates one example of an internal configuration of a housing box 210.

A battery station 200 is described by using FIGS. 2 and 3. FIG. 2 schematically illustrates one example of an appearance of the battery station 200. As illustrated in FIG. 2, in this embodiment, the battery station 200 includes one or more housing boxes 210. The mobile battery 10 is housed in each of the one or more housing boxes 210. The mobile battery 10 may be a portable storage battery. The type of the storage battery is not limited particularly. For example, any type of secondary battery can be used. The weight of the mobile battery 10 may be 1 kg or more, 3 kg or more, 5 kg or more, or 10 kg or more. The weight of the mobile battery 10 is not limited thereto.

In this embodiment, the mobile battery 10 includes a connector 12. The connector 12 may include at least one of a power line and a communication line. The connector 12 may be a connector for wired connection or may be a connector for wireless connection. In a case where the connector 12 is a connector for wired connection, the connector 12 is preferably arranged in a groove or a recess part formed on one surface (for example, a bottom surface) of the mobile battery 10. Accordingly, it is possible to suppress the breakage of the connector 12. The mobile battery 10 may be one example of a storage battery. The connector 12 may be one example of a first connector.

FIG. 3 schematically illustrates one example of an internal configuration of a housing box 210. FIG. 3 may be one example of a side section of the housing box 210 in a state where the lid of the housing box 210 is closed. In this embodiment, FIG. 3 includes (i) a schematic view of a side section of the housing box 210 in a state 302 where the connector 12 of the housed mobile battery 10 is not connected electrically and (ii) a schematic view of a side section of the housing box 210 in a state 304 where the connector 12 of the housed mobile battery 10 is connected electrically.

For example, when the lid of the housing box 210 is locked after the lid of the housing box 210 is closed, the state of the housing box 210 is shifted from the state 302 to the state 304. In addition, when the lid of the housing box 210 is unlocked, the state of the housing box 210 is shifted from the state 304 to the state 302.

In this embodiment, for example, the housing box 210 includes a housing 320, a battery holder 330, a connector 340, a connector holder 342, and a connection control part 350. In this embodiment, for example, the housing 320 includes a lid 322, a hinge 324, and a position adjusting member 326. In this embodiment, for example, the connection control part 350 includes a drive member 352 and a detection member 354.

The housing 320 may be one example of a casing. The lid 322 may be one example of a lid part. The position adjusting member 326 may be one example of a positioning part. The battery holder 330 may be one example of a storage battery holding part. The connector 340 may be one example of a second connector. The connector holder 342 may be one example of a connector holding part. The connection control part 350 may be one example of a drive part. The drive member 352 may be one example of a power transmission part. The detection member 354 may be one example of an opening and closing detection part and a holding detection part.

In this embodiment, for example, the housing 320 houses the mobile battery 10 therein. The housing 320 may store a single mobile battery 10 or may store a plurality of mobile batteries 10. In this embodiment, an opening 321 having a size available for carrying in or out the mobile battery 10 is formed in the housing 320. In this embodiment, the lid 322 is configured to be capable of opening and closing the opening 321 by a rotational operation. For example, the lid 322 is attached to the housing 320 by the hinge 324 to cover the opening 321. In another embodiment, the lid 322 may be configured to be capable of opening and closing the opening 321 by a sliding operation.

In this embodiment, the position adjusting member 326 is arranged inside the housing 320 and defines the position of the connector holder 342. For example, the position adjusting member 326 defines the position of the connector holder 342 in a state where the lid 322 is closed completely. The position adjusting member 326 may position the connector holder 342 such that the connector 12 and the connector 340 are connected electrically in a state where the lid 322 is closed completely.

In this embodiment, the position adjusting member 326 defines the installation surface of the connection control part 350. Accordingly, for example, the position adjusting member 326 can define the height of the connector holder 342 in a case where the connection control part 350 pushes up the connector holder 342. As a result, for example, the connection control part 350 can connect the connector 340 to the connector 12 while suppressing the breakage of at least one of the connector 12 and the connector 340. The position adjusting member 326 includes an elastic member or a buffer member and may absorb a part of an impact generated when the connector 340 is connected to the connector 12.

In this embodiment, the battery holder 330 holds the mobile battery 10. In this embodiment, the battery holder 330 is arranged on a surface (referred to as the inside surface of the lid 322, the inner surface of the lid 322, or the like in some cases) facing the inside of the housing 320 among one or more surfaces of the lid 322. The battery holder 330 may define a relative position of the lid 322 and the mobile battery 10 held by the battery holder 330. Accordingly, the mobile battery 10 also moves as the lid 322 is opened and closed. The battery holder 330 may hold the mobile battery 10 above the bottom surface of the housing 320 in a state where the lid 322 is closed completely. Accordingly, it is possible to suppress the breakage at least one of the connector 12 and the connector 340.

In this embodiment, the connector 340 is connected electrically with the connector 12. The connector 340 may transmit and receive information to and from the mobile battery 10 through the connector 12. For example, the connector 340 may transmit and receive information to and from a memory (not illustrated) arranged in the mobile battery 10 through the connector 12. The connector 340 may be connected with the connector 12 in a detachable manner.

The connector 340 may be connected electrically with a charging device 390. The charging device 390 charges the mobile battery 10 through the connector 12 and the connector 340. The charging device 390 may be one example of a charging part. The connector 340 may transmit and receive information to and from the charging device 390 or another external device through a communication network.

In this embodiment, the communication network may be a transmission line of wired communication, may be a transmission line of wireless communication, or may be a combination of a transmission line of wireless communication and a transmission line of wired communication. The communication network may include a wireless packet communication network, the Internet, a P2P network, a leased line, a VPN, a power line communication line, and the like. The communication network may include (i) a mobile communication network such as a mobile phone line network and (ii) a wireless communication network such as a wireless MAN (for example, WiMAX (registered trademark)), a wireless LAN (for example, WiFi (registered trademark)), a Bluetooth (registered trademark), a Zigbee (registered trademark), and a near field communication (NFC).

In this embodiment, the connector holder 342 holds the connector 340. The connector holder 342 is driven to be moved by the connection control part 350. The connector holder 342 may be configured to move translationally in an insertion direction (the vertical direction in the drawings) of the mobile battery 10. In this case, the angle of the insertion direction of the mobile battery 10 with respect to the vertical direction is changed according to the opening and closing of the lid 322. For example, a part of the connector holder 342 may be arranged to cover one end of the battery holder 330. The connector holder 342 may be configured such that a part of the connector holder 342 slides on the outer portion of the battery holder 330.

In one embodiment, the connector 340 moves together with the lid 322 according to the opening and closing operation of the lid 322. For example, in a case where the connector holder 342 is connected with the battery holder 330, the connector 340 rotates about the hinge 324 together with the lid 322 according to the opening and closing operation of the lid 322. In a case where the lid 322 is a sliding type, the connector 340 may slide together with the lid 322 according to the opening and closing operation of the lid 322.

In another embodiment, the connector 340 moves according to the opening and closing operation of the lid 322 but is moved by the driving force different from the driving force of the lid 322. For example, in a case where the connector holder 342 is connected with the connection control part 350, and the connector holder 342 is configured to be detachable from the battery holder 330, the connection control part 350 detects the opening and closing operation of the lid 322 and drives the connector holder 342 during the opening and closing operation of the lid 322, so as to move the connector 340.

In still another embodiment, the connector 340 is configured such that the position of the connector 340 is not affected by the opening and closing operation of the lid 322. For example, in a case where the connector holder 342 is connected with the connection control part 350, and the connector holder 342 is configured to be detachable from the battery holder 330, the connection control part 350 detects the opening and closing operation of the lid 322 and drives the connector holder 342 during the period before and after the opening and closing operation of the lid 322, so as to move the connector 340.

[Outline of Connection Control Part 350]

In this embodiment, the connection control part 350 controls a relative position of the connector 12 and the connector 340. Accordingly, the connection control part 350 can control at least one the connection and the separation of the connector 12 and the connector 340. The connection control part 350 may control the relative position of the connector 12 and the connector 340 by moving the connector 340. For example, the connection control part 350 controls the relative position of the connector 12 and the connector 340 by controlling the relative position of the battery holder 330 and the connector holder 342. The connection control part 350 may control the relative position of the connector 12 and the connector 340 such that the change rate of the relative position of the connector 12 and the connector 340 is larger than the change rate of the relative position of the connector 12 and the battery holder 330.

In one embodiment, the connection control part 350 controls the relative position of the connector 12 and the connector 340 such that the change rate of the relative position of the connector 12 and the connector 340 is larger than the change rate of the relative position of the connector 12 and the battery holder 330 during the period until the connector 12 and the connector 340 are connected after the mobile battery 10 is held in the holding position of the battery holder 330. In another embodiment, the connection control part 350 controls the relative position of the connector 12 and the connector 340 such that the change rate of the relative position of the connector 12 and the connector 340 is larger than the change rate of the relative position of the connector 12 and the battery holder 330 during the period until the connected connector 12 and connector 340 are separated.

Accordingly, according to one embodiment, the breakage of the connector 12 and the connector 340 is suppressed. According to another embodiment, even in a case where the insertion load and/or the pull-out load of the connector 12 and the connector 340 is large, the burden of the user is reduced. As a result, the convenience of the user is improved. In addition, it is possible to prevent the user from forcibly inserting the mobile battery 10 into the battery holder 330 or forcibly pulling out the mobile battery 10 from the battery holder 330.

At least a part of the connection control part 350 may be coupled with at least a part of the lid 322 and the battery holder 330, and the connection control part 350 may move according to the opening and closing operation of the lid 322. At least a part of the connection control part 350 may be fixed inside the housing 320. In one embodiment, the connection control part 350 includes a mechanical mechanism which converts at least one of (i) the force generated by opening and closing the lid 322 and (ii) the gravity acting on the mobile battery 10 into the driving force of the connection control part 350. The force generated by opening and closing the lid 322 may be a rotating force generated by opening and closing the lid 322. A power transmission mechanism and a differential drive mechanism can be exemplified as the mechanical mechanism. A cam mechanism and a link mechanism can be exemplified as the power transmission mechanism. In another embodiment, the connection control part 350 may include a machine powered by electricity, compressed air, or the like. For example, the connection control part 350 includes an actuator or a motor.

According to this embodiment, the mobile battery 10 is held by the battery holder 330. Thus, even when the lid 322 is opened and closed, the relative position of the mobile battery 10 and the lid 322 is not changed(as long as the mobile battery 10 is not fallen off from the battery holder 330). In addition, in a state where the lid 322 is closed completely, the mobile battery 10 is held at a position above the bottom surface of the housing 320. In this embodiment, the connection control part 350 drives the connector 340 to adjust the relative position of the mobile battery 10 and the connector 340. Accordingly, the connection control part 350 can connect the connector 12 and the connector 340 while preventing the breakage of the connector 12 and the connector 340.

In one embodiment, the connection control part 350 moves the connector 340 toward the connector 12 when the connector 340 is to be connected to the connector 12. For example, the connection control part 350 drives at least one of the connector 340 and the connector holder 342 such that the connector 340 moves toward the connector 12 as the lid 322 is closed. The connection control part 350 drives at least one of the connector 340 and the connector holder 342 such that the movement of the connector 340 is ended (i) when the lid 322 is closed completely or (ii) before the lid 322 is closed completely. The connection control part 350 may move at least one of the connector 340 and the connector holder 342 toward the connector 12 after the lid 322 is closed completely.

In another embodiment, the connection control part 350 moves the connector 340 already connected to the connector 12 in a direction in which the connector 340 is separated from the connector 12. For example, the connection control part 350 drives at least one of the connector 340 and the connector holder 342 such that the connector 340 moves in the direction away from the connector 12 as the lid 322 is opened. The connection control part 350 may drive at least one of the connector 340 and the connector holder 342 such that the movement of the connector 340 is ended (i) when the lid 322 is opened completely or (ii) before the lid 322 is opened completely. The connection control part 350 may move at least one of the connector 340 and the connector holder 342 in the direction away from the connector 12 after the lid 322 is opened completely.

In this embodiment, the drive member 352 drives at least one of the connector 340 and the connector holder 342. In the drive member 352, at least a part includes a mechanical mechanism which converts at least one of (i) the force generated by opening and closing the lid 322 and (ii) the gravity acting on the mobile battery 10 into the driving force. The force generated by opening and closing the lid 322 may be a rotating force generated by opening and closing the lid 322. A power transmission mechanism and a differential drive mechanism can be exemplified as the mechanical mechanism. A cam mechanism and a link mechanism can be exemplified as the power transmission mechanism. The drive member 352 may include at least one of one or more cam mechanisms and one or more link mechanisms. The mechanical mechanism may be one example of a power transmission part. In the drive member 352, at least a part may include a machine powered by electricity, compressed air, or the like. An actuator and a motor can be exemplified as the machine.

The drive member 352 may move at least one of the connector 340 and the connector holder 342 according to the detection of the detection member 354 on the opening and closing of the lid 322. The drive member 352 may move at least one of the connector 340 and the connector holder 342 according to the detection of the detection member 354 on the holding of the mobile battery 10. In a case where the detection member 354 is a part of the above-described mechanical mechanism, the operation of the drive member 352 according to the detection of the detection member 354 on the opening and closing of the lid 322 or the holding of the mobile battery 10 may mean that the drive member 352 is operated in conjunction with the operation of the detection member 354 according to the opening and closing of the lid 322 or the holding of the mobile battery 10.

In this embodiment, for example, the detection member 354 detects the opening and closing of the lid 322. The detection member 354 may detect that the battery holder 330 holds the mobile battery 10. The detection member 354 may be a part of the above-described mechanical mechanism or may be various kinds of sensors. For example, a pressure sensor, a contact sensor, and a camera can be exemplified as the sensor.

[Specific Configuration of Each Part of Connection Control Part 350]

Each part of the connection control part 350 may be realized by hardware, realized by software, or realized by hardware and software. In each part of the connection control part 350, at least a part thereof may be realized by a single server or realized by a plurality of servers. In each part of the connection control part 350, at least a part thereof may be realized on a virtual server or a cloud system. In each part of the connection control part 350, at least a part thereof may be realized by a personal computer or a portable terminal. Examples of the portable terminal may include a mobile phone, a smartphone, a PDA, a tablet, a notebook computer or a laptop computer, a wearable computer, and the like. Each part of the connection control part 350 may use a distributed ledger technique such as a block chain or a distributed network to store information.

In a case where at least a part of the components configuring the connection control part 350 is realized by software, the components realized by the software may be realized by starting the software or the program defining an operation regarding the components in an information processor having a general configuration. The information processor having the general configuration may include (i) a data processor including a processor such as a CPU and a GPU, a ROM, a RAM, a communication interface, or the like (ii) an input device such as a keyboard, a pointing device, a touch panel, a camera, an audio input device, a gesture input device, various kinds of sensors, and a GPS receiver, (iii) an output device such as a display device, an audio output device, and a vibration device, and (iv) a storage device (including an external storage device) such as a memory, a HDD, and an SSD.

In the information processor having the general configuration, the above-described data processor or storage device may store the above-described software or program. The software or program is executed by the processor to cause the information processor to execute the operation defined by the software or the program. The software or the program may be stored in a non-temporary computer readable recording medium. The software or the program may be a program which makes the computer to function as the connection control part 350 or a part thereof. The software or the program may be a program which makes the computer to execute an information processing in the connection control part 350 or a part thereof.

Figure 4:
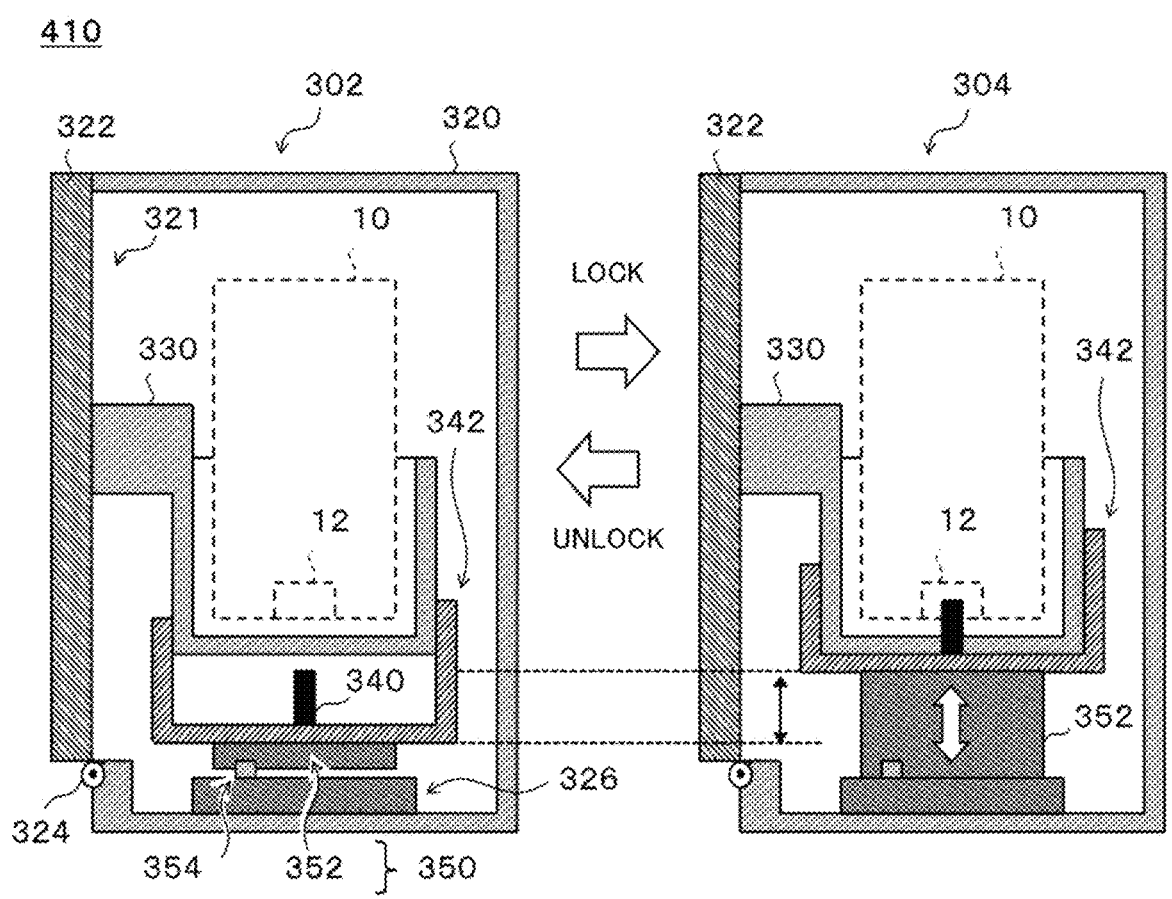
FIG. 4 schematically illustrates one example of an internal configuration of a housing box 410.

FIG. 4 schematically illustrates one example of an internal configuration of the housing box 410. In this embodiment, the housing box 410 is different from the housing box 210 in that the connection control part 350 is arranged in the connector holder 342. The housing box 410 may have a configuration similar with the housing box 210 except the above-described difference.

For example, the drive member 352 is elongated when the detection member 354 detects the closing operation of the lid 322. The position adjusting member 326 is arranged at an appropriate position and height of the housing 320. When the drive member 352 comes into contact with the position adjusting member 326, the drive member 352 moves the connector holder 342 toward the battery holder 330. Accordingly, the connector 340 moves toward the connector 12 held by the battery holder 330. On the other hand, when the detection member 354 detects the opening operation of the lid 322, (i) the drive member 352 is contracted or (ii) the drive member 352 separates the connector holder 342 from the battery holder 330. Accordingly, it is possible to separate the connector 12 and the connector 340.

Figure 5:
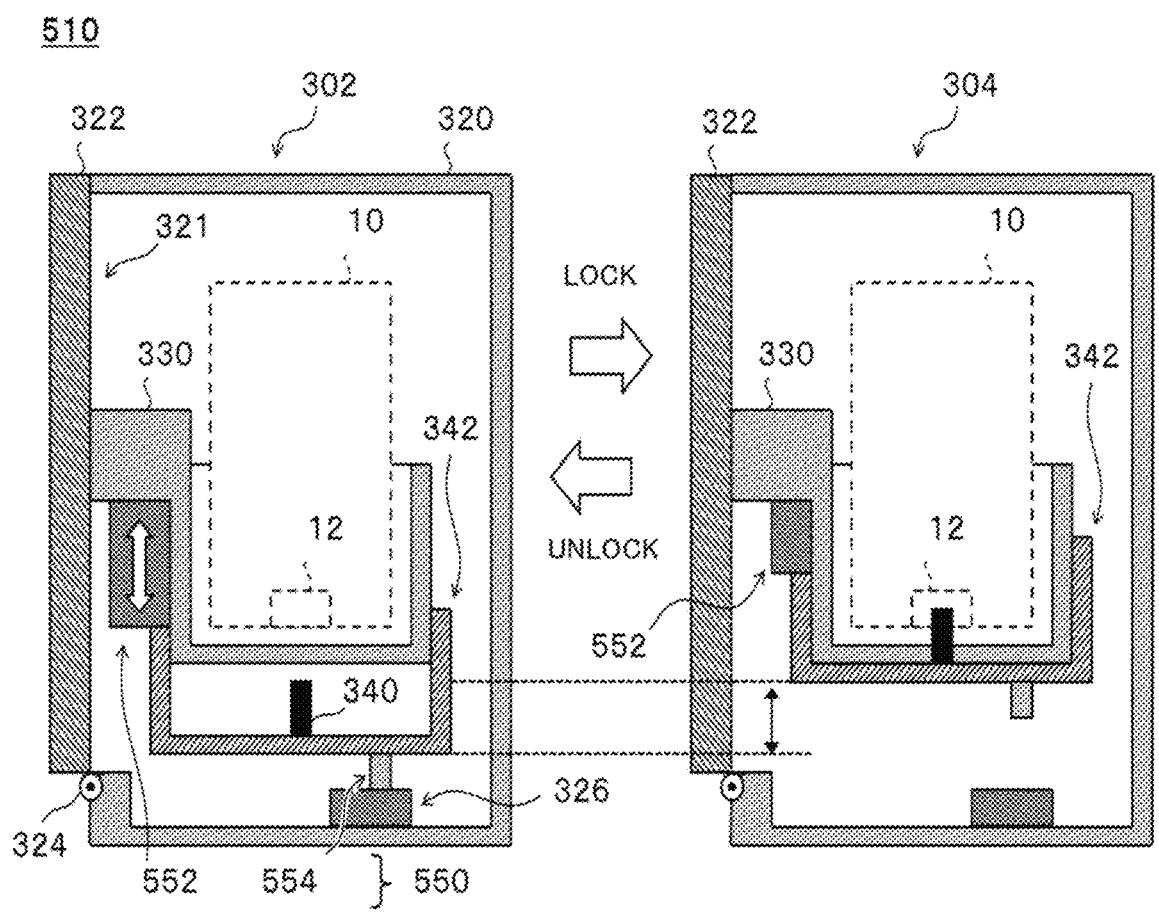
FIG. 5 schematically illustrates one example of an internal configuration of a housing box 510.

FIG. 5 schematically illustrates one example of an internal configuration of a housing box 510. In this embodiment, the housing box 510 is different from the housing box 210 and the housing box 410 in that the connection control part 550 is included instead of the connection control part 350. The housing box 510 may have a configuration similar with the housing box 210 or the housing box 410 except the above-described difference.

In this embodiment, the connection control part 550 includes a drive member 552 and a detection member 554. The drive member 552 and the detection member 554 may have configurations similar with the drive member 352 and the detection member 354, respectively. In this embodiment, in the drive member 552, at least a part is arranged between the battery holder 330 and the connector holder 342. In this embodiment, the connection control part 550 controls the relative position of the battery holder 330 and the connector holder 342 by adjusting the length of the drive member 552 arranged between the battery holder 330 and the connector holder 342. A method of adjusting the length of the drive member 552 is not limited particularly.

The configuration of the connection control part 550 is not limited to this embodiment. In another embodiment, the connection control part 550 may be arranged on the surface on which the connector 340 of the connector holder 342 is held. In still another embodiment, a plurality of drive members 552 may be provided. In addition, the embodiments of FIGS. 3 to 5 may be used in combination.

Figure 6:
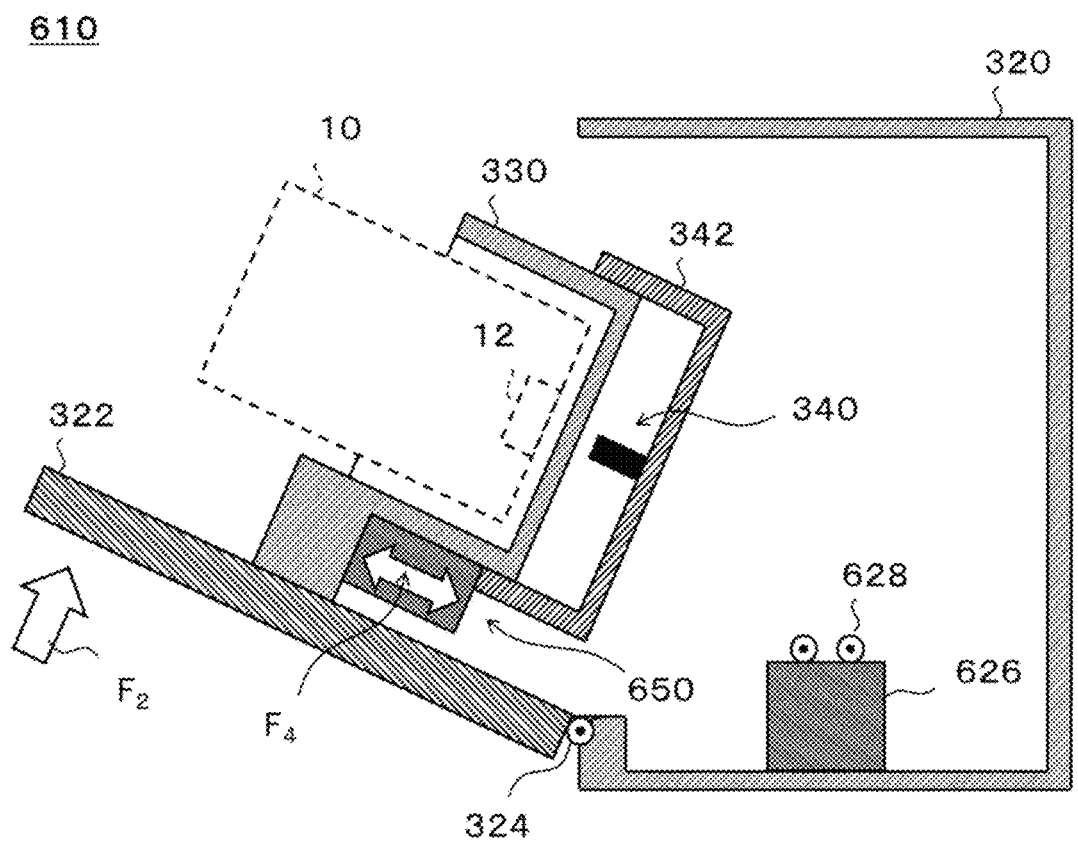
FIG. 6 schematically illustrates one example of an internal configuration of a housing box 610.
Figure 7:
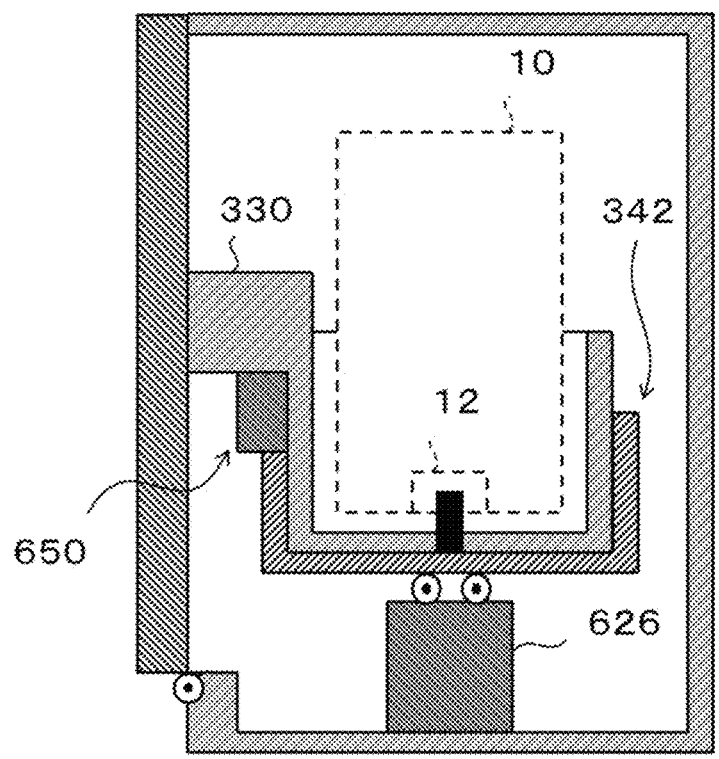
FIG. 7 schematically illustrates one example of the internal configuration of the housing box 610.

A housing box 610 is described by using FIGS. 6 and 7. FIG. 6 schematically illustrates one example of an internal configuration of the housing box 610 in a state where the lid 322 is opened. FIG. 7 schematically illustrates one example of the internal configuration of the housing box 610 in a state where the lid 322 is closed. The housing box 610 is different from the housing box 510 in that a connection control part 650 is included instead of the connection control part 550, and a position adjusting member 626 and a roller 628 are included instead of the position adjusting member 326.

In this embodiment, as a drive member, the connection control part 650 includes a mechanical mechanism which converts at least one of (i) the force generated by opening and closing the lid 322 and (ii) the gravity acting on the mobile battery 10 into the driving force of the connection control part 350. The force generated by opening and closing the lid 322 may be a rotating force generated by opening and closing the lid 322. Accordingly, for example, force $F_2$ for opening and closing the lid 322 is converted into force $F_4$ for driving the connector holder 342. A power transmission mechanism and a differential drive mechanism can be exemplified as the mechanical mechanism. A cam mechanism and a link mechanism can be exemplified as the power transmission mechanism. At least a part of the above-described mechanical mechanism may be used as the detection member. For example, a part of the power transmission mechanism of the connection control part 650 is operated according to the opening and closing of the lid 322, and another part of the power transmission mechanism is operated in conjunction with the operation of the part, so that the relative position of the battery holder 330 and the connector holder 342 is changed.

According to this embodiment, the length of the connection control part 650 arranged between the battery holder 330 and the connector holder 342 in a state where the lid 322 is opened is longer than the length of the connection control part 650 in a state where the lid 322 is closed. For example, the length of the connection control part 650 increases as the opening degree of the lid 322 increases. For this reason, in FIG. 6, the connector 340 and the connector 12 are not connected. When the lid 322 is closed from the state of FIG. 6, the length of the connection control part 650 arranged between the battery holder 330 and the connector holder 342 is shortened. Further, when the lid 322 is closed, the connector holder 342 comes into contact with the roller 628.

In this embodiment, the position of the roller 628 is set by the position adjusting member 626 such that the connector 12 and the connector 340 are connected electrically in a state where the lid 322 is closed completely. For this reason, as the lid 322 is further closed after the connector holder 342 comes into contact with the roller 628, the connector 340 moves toward the connector 12. At this time, the mobile battery 10 is held by the battery holder 330. Thus, it is possible to prevent that at least one of the connector 12 and the connector 340 is damaged by the mass of the mobile battery 10. Similarly, as the lid 322 is opened from a state where the lid 322 is closed, the length of the connection control part 650 arranged between the battery holder 330 and the connector holder 342 may be extended.

[Embodiment with Connection Control Part Including Cam Mechanism]

Figure 8:
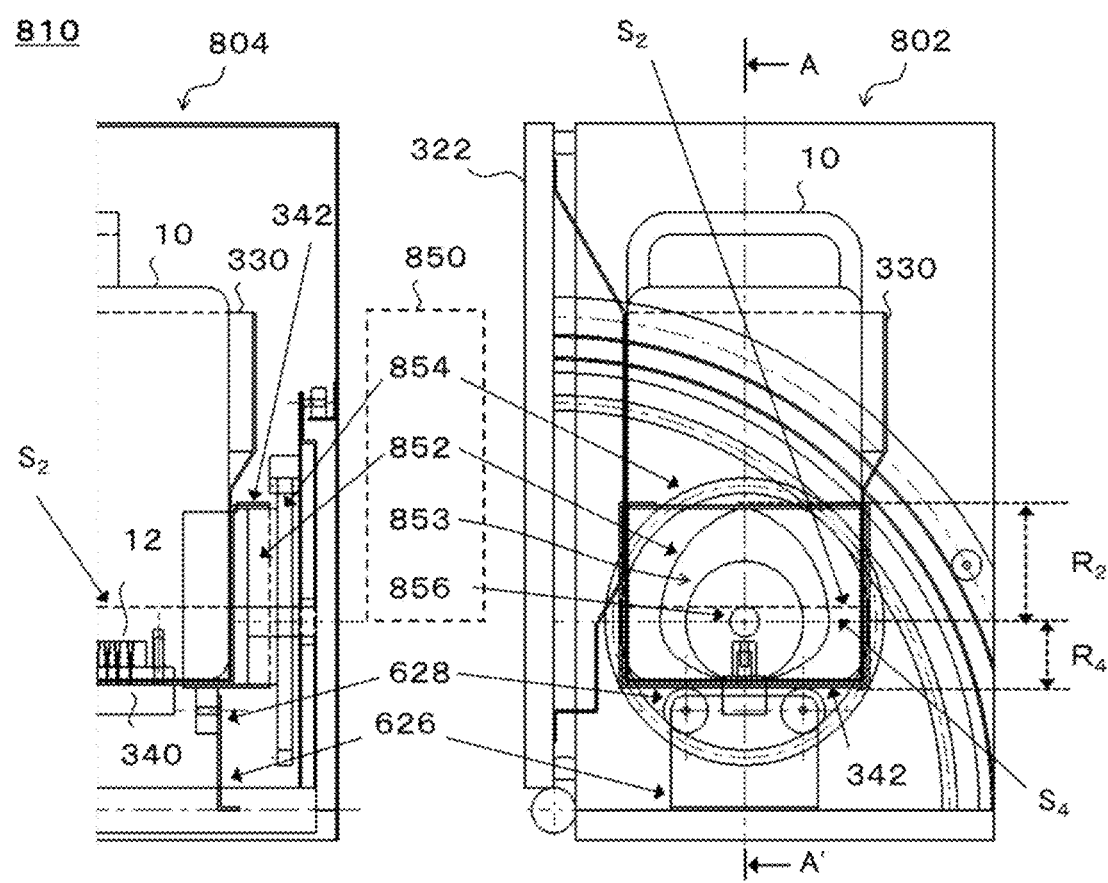
FIG. 8 schematically illustrates one example of an internal configuration of a housing box 810.
Figure 9:
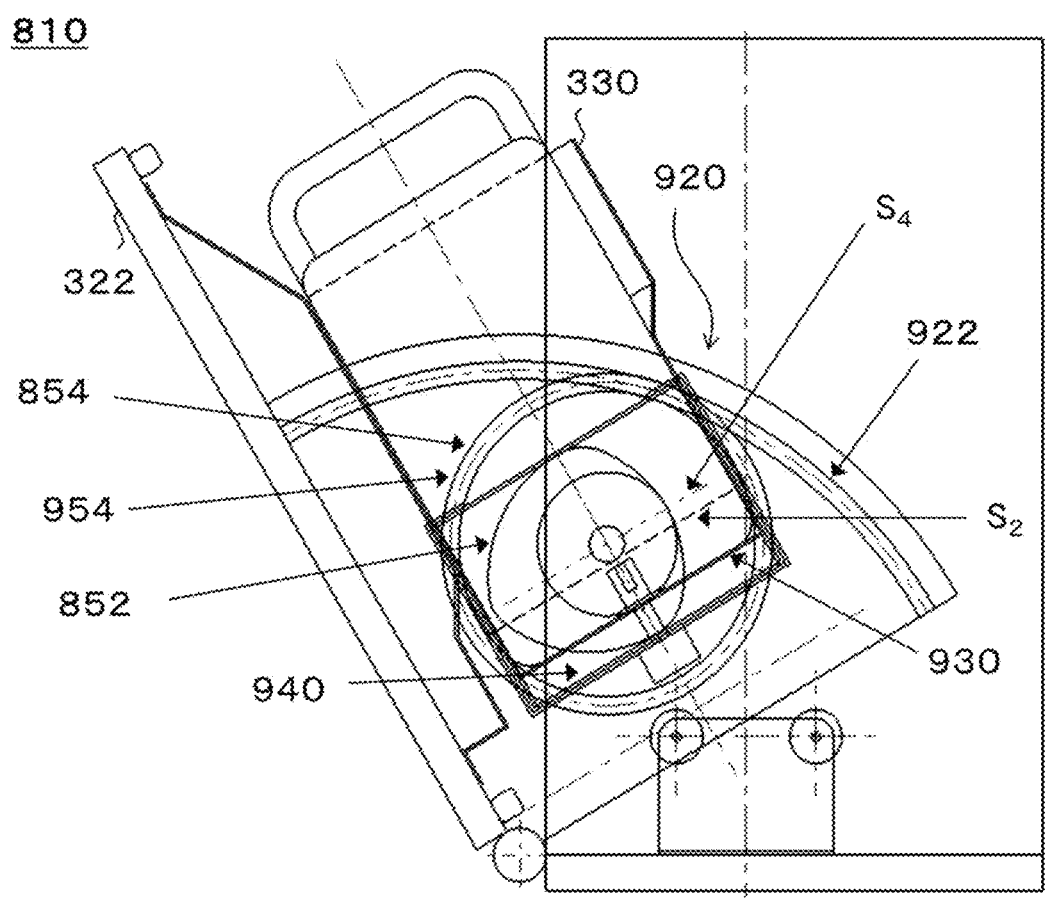
FIG. 9 schematically illustrates one example of an internal configuration of the housing box 810.
Figure 10:
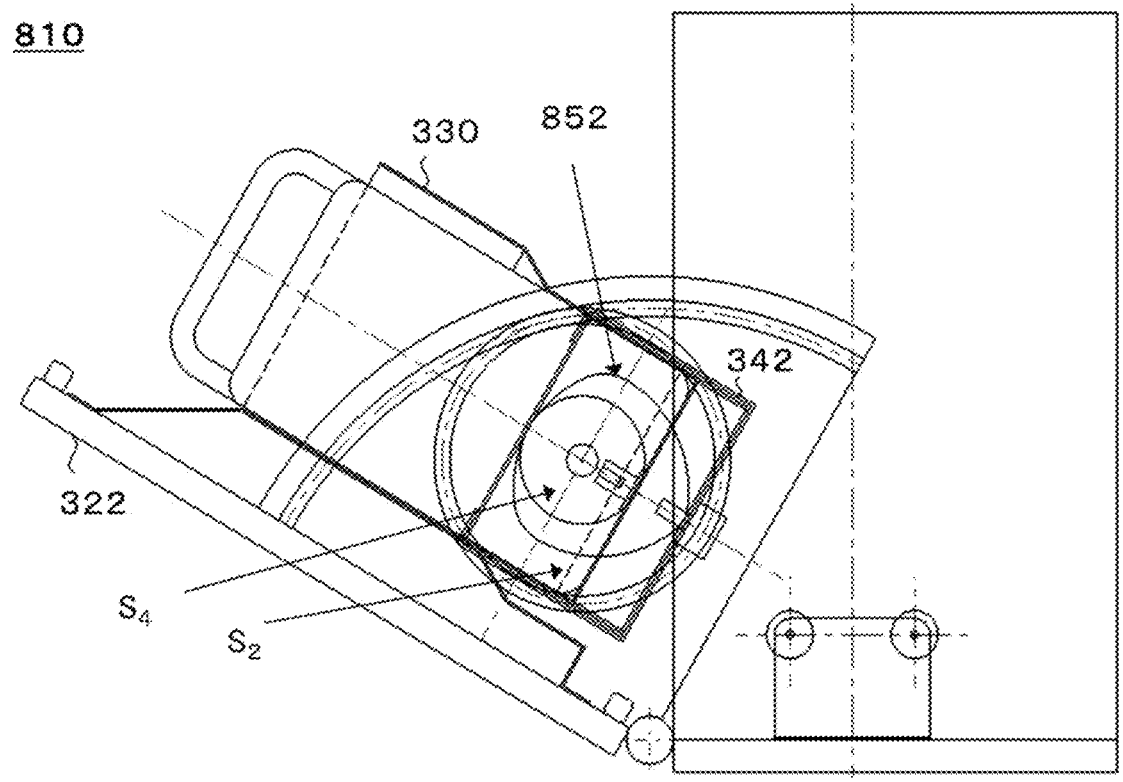
FIG. 10 schematically illustrates one example of the internal configuration of the housing box 810.

A housing box 810 is described by using FIGS. 8, 9, and 10. FIG. 8 illustrates a side section 802 of the housing box 810 in a state where the lid 322 is closed completely and a cross section A-A' 804. FIG. 9 illustrates the side section 802 of the housing box 810 in a state where the lid 322 is opened partially. FIG. 10 illustrates the side section 802 of the housing box 810 in a state where the lid 322 is opened completely. The housing box 810 is different from the housing box 610 in that the housing box includes a connection control part 850 as a specific example of the connection control part 650. The housing box 810 may have a configuration similar with the housing box 610 except the above-described difference.

As illustrated in FIG. 8, in this embodiment, the connection control part 850 includes a cam 852 and a rotation member 854 rotated by the opening and closing operation of the lid 322. The cam 852 and the rotation member 854 are attached to the same rotational axis 856. In the drawings, reference sign 853 indicates a reference circle of the cam 852. In addition, as illustrated in FIG. 9, a gear 954 is arranged in an outer peripheral portion of the rotation member 854. On the other hand, a rail member 920 is attached to the lid 322. A gear 922 engaged with the gear 954 of the rotation member 854 is arranged in the rail member 920. Accordingly, the cam 852 rotates about the rotational axis 856 by the opening and closing operation of the lid 322. In this embodiment, the connector holder 342 functions as a follower of the cam 852. Accordingly, the connector holder 342 moves translationally to the battery holder 330 in conjunction with the opening and closing operation of the lid 322. The relative position of the connector 12 and the connector 340 is adjusted by the translational movement of the connector holder 342. For example, as illustrated in FIG. 9, an outer surface 930 of the battery holder 330 and an inner surface 940 of the connector holder 342 face each other. As illustrated in FIGS. 8 to 10, the distance of the outer surface 930 and the inner surface 940 in a state where the lid 322 is closed is smaller than the distance of the outer surface 930 and the inner surface 940 in a state where the lid 322 is opened.

[Operation with Lid 322 Opened]

As illustrated in FIG. 8, in a state where the lid 322 is closed completely, a distance between the rotational axis 856 and the inner surface 940 of the connector holder 342 is substantially the same as a reference circle radius $R_4$ of the cam 852. At this time, an opening surface $S_2$ of the connector holder 342 is positioned above a surface $S_4$ perpendicular to the insertion direction (a vertical direction in FIG. 8) of the mobile battery 10 through the rotational axis 856. That is, the distance between the opening surface $S_2$ and the outer surface 930 of the battery holder 330 is longer than the distance between the surface $S_4$ and the inner surface 940 of the battery holder 330. On the other hand, as illustrated in FIG. 10, in a state where the lid 322 is opened completely, the distance between the rotational axis 856 and the inner surface 940 of the connector holder 342 is substantially the same as the length $R_2$ of the long diameter of the cam 852. For this reason, according to this embodiment, as the lid 322 is opened, force of the cam 852 pushing the connector holder 342 becomes large.

According to this embodiment, when an operation of opening the lid 322 starts, as the lid 322 is opened, the cam 852 pushes the connector holder 342, and thus the connector holder 342 is gradually separated from the battery holder 330. This point is understood from the fact that the distance between the opening surface $S_2$ and the outer surface 930 of the battery holder 330 is shorter than the distance between the surface $S_4$ and the inner surface 940 of the battery holder 330 in FIG. 10. Further, when the connector holder 342 and the battery holder 330 are separated to some extent, the connector 340 is detached from the connector 12.

[Operation with Lid 322 Closed]

In a case where the lid 322 is closed, the operation of the connection control part 650 may be similarly with that of the connection control part 550. As illustrated in FIG. 10, in this embodiment, in a state where the lid is opened, the connector holder 342 and the battery holder 330 are separated sufficiently, and the connector 340 and the connector 12 are also separated. When the operation of closing the lid 322 starts, as the lid 322 is closed, the rail member 920 fixed to the lid 322 moves to rotate the rotation member 854. The cam 852 and the rotation member 854 are attached to the same rotational axis 856, and a relation of the long diameter of the cam 852 and the reference circle is as above. For this reason, as the lid 322 is closed, force of the cam 852 pushing the connector holder 342 becomes small. Further, when the lid 322 is closed, the outer surface of the connector holder 342 comes into contact with the roller 628. As the lid 322 is further closed after the connector holder 342 comes into contact with the roller 628, the connector holder 342 moves toward the battery holder 330. As a result, the connector 340 moves toward the connector 12, and the connector 340 and the connector 12 are connected finally.

[Embodiment with Connection Control Part Including Link Mechanism]

Figure 11:
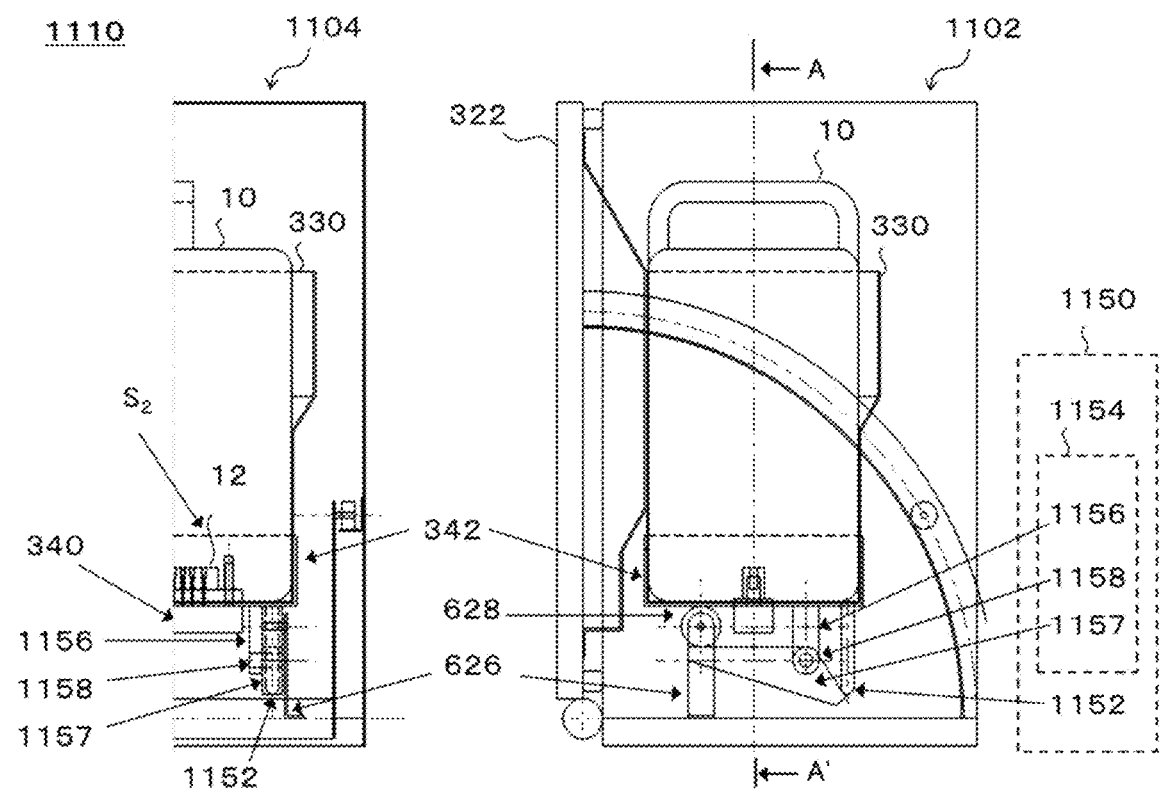
FIG. 11 schematically illustrates one example of an internal configuration of the housing box 1110.
Figure 12:
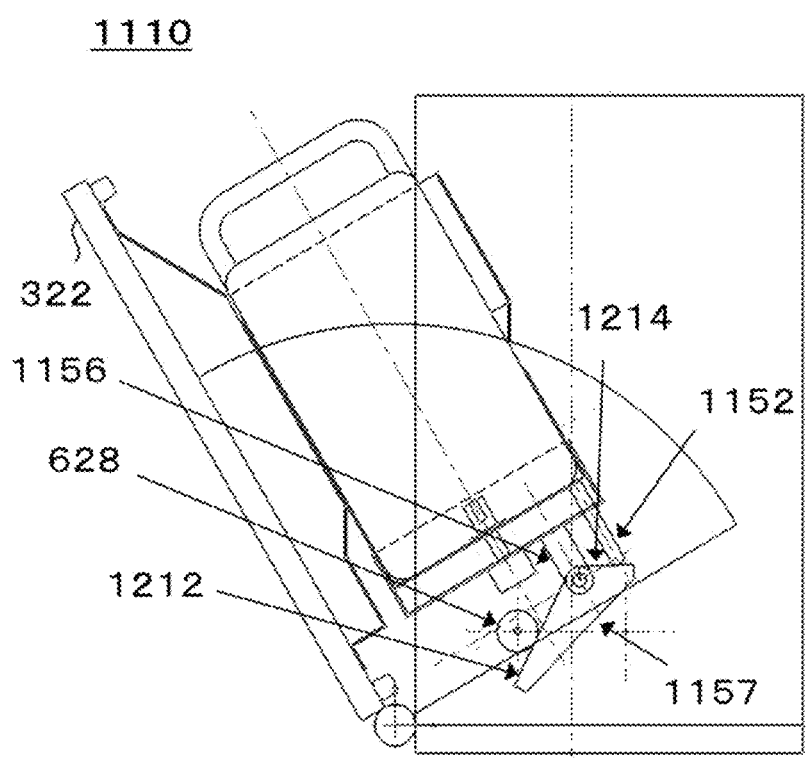
FIG. 12 schematically illustrates one example of the internal configuration of the housing box 1110.
Figure 13:
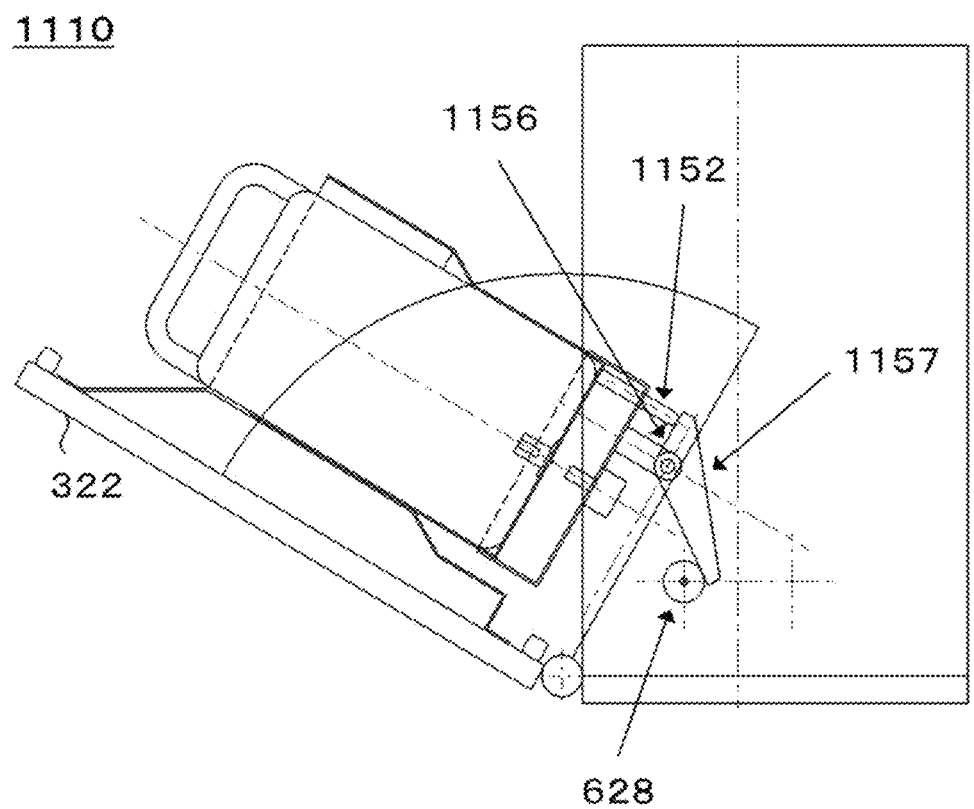
FIG. 13 schematically illustrates one example of the internal configuration of the housing box 1110.

A housing box 1110 is described by using FIGS. 11 to 13. FIG. 11 illustrates a side section 1102 of the housing box 1110 in a state where the lid 322 is closed completely and a cross section A-A' 1104. FIG. 12 illustrates the side section 1102 of the housing box 1110 in a state where the lid 322 is partially opened. FIG. 13 illustrates the side section 1102 of the housing box 1110 in a state where the lid 322 is opened completely. The housing box 1110 is different from the housing box 610 and the housing box 810 in that a connection control part 1150 is included as a specific example of the connection control part 650. In addition, the housing box 1110 is different from the housing box 610 and the housing box 810 in that the connection control part 1150 is included in a bottom portion of the connector holder 342. The housing box 1110 may have a configuration similar with the housing box 610 or the housing box 810 except the above-described difference.

In this embodiment, the connection control part 1150 includes a rod 1152 and a link 1154. In this embodiment, the link 1154 includes a link member 1156 and a link member 1157. The link member 1157 can rotate about the rotational axis 1158. In this embodiment, the connector holder 342 is configured to move translationally in the insertion direction of the mobile battery 10.

The rod 1152 may be one example of an extension member. The link 1154 may be one example of a link member. The link member 1157 may be one example of a first link member. The link member 1156 may be one example of a second link member.

In this embodiment, the rod 1152 is arranged on a surface facing the connector holder 342 among the surfaces of the battery holder 330. For example, the rod 1152 is arranged on the bottom surface of the battery holder 330. An opening for passing through the rod 1152 is formed at the position corresponding to the rod 1152 of the connector holder 342. Accordingly, the rod 1152 can extend in the insertion direction (a vertical direction in FIG. 11) of the mobile battery 10 through the connector holder 342.

In this embodiment, the link 1154 is arranged on the surface (referred to as the bottom surface of the connector holder 342 in some cases) opposite to the surface (referred to as the inner surface of the connector holder 342 in some cases) facing the battery holder 330 among the surfaces of the connector holder 342. In this embodiment, one end of the link member 1156 is fixed to the bottom surface of the connector holder 342. The other end of the link member 1156 is rotatably coupled with the link member 1157. In the embodiment, the link member 1157 includes a surface 1212 contacting the roller 628 and a surface 1214 contacting the rod 1152. The link member 1157 is coupled with the rotational axis 1158 so as to rotate about an axis located near the intersection of the surface 1212 and the surface 1214.

[Operation with Lid 322 Opened]

In the state of FIG. 11, when the operation of opening the lid 322 starts, the link member 1157 rotates about the rotational axis 1158, and the surface 1214 of the link member 1157 pushes the rod 1152. The connector holder 342 is separated from the battery holder 330 by the force of the link member 1157 pushing the rod 1152. Further, when the connector holder 342 and the battery holder 330 are separated to some extent, the connector 340 is detached from the connector 12.

[Operation with Lid 322 Closed]

As illustrated in FIG. 13, in this embodiment, in a state where the lid 322 is opened, the connector holder 342 and the battery holder 330 are separated sufficiently, and the connector 340 and the connector 12 are also separated. In addition, the position of the roller 628 is set such that the connector 12 and the connector 340 are connected electrically in a state where the lid 322 is closed completely. In a stage where the lid 322 is closed to some extent, the outer surface of the connector holder 342 comes into contact with the roller 628. As the lid 322 is further closed after the connector holder 342 comes into contact with the roller 628, the connector holder 342 moves toward the battery holder 330. As a result, the connector 340 moves toward the connector 12, and the connector 340 and the connector 12 are connected finally.

As the distance between the outer surface of the battery holder 330 and the inner surface of the connector holder 342 decreases, the length of the rod 1152 protruding from the outer surface of the connector holder 342 is extended. As the length of the rod 1152 protruding from the outer surface of the connector holder 342 is extended, the rod 1152 pushes the surface 1214 of the link member 1157. The link member 1157 rotates about the rotational axis 1158 by the amount pushed by the rod 1152. Accordingly, such an operation can be included in the next operation of opening the lid 322.

Hereinbefore, the invention has been described by using the embodiments. However, the technical range of the invention is not limited to the range described in the embodiments. It is apparent to those skilled in the art that various changes or improvements can be made in the embodiments. In addition, the items described in a specified embodiment may be applied to another embodiment within technically consistent ranges. In addition, the components may have features similar with those of other components having the same names and different reference signs. It is apparent from the appended claims that the embodiment thus changed or improved can also be included in the technical range of the invention.

It should be noted that the processes such as the operations, procedures, steps, and stages in the device, system, program, and method shown in the claims, the specification, or the drawings can be performed in any order as long as the execution order is not indicated by "prior to", "before", or the like, and the output from a previous process is not used in a later process. Even if an operation flow in the claims, the specification, and the drawings is described with the use of "first", "next" and the like for convenience, it does not mean that the operation is necessarily to be implemented in that order.

EXPLANATION OF REFERENCES

10 mobile battery
12 connector
100 housing device
102 storage battery
104 first connector
106 second connector
110 storage battery holding part
120 drive part
200 battery station
210 housing box
302 state
304 state
320 housing
321 opening
322 lid
324 hinge
326 position adjusting member
330 battery holder
340 connector
342 connector holder
350 connection control part
352 drive member
354 detection member
390 charging device
410 housing box
510 housing box
550 connection control part
552 drive member
554 detection member
610 housing box
626 position adjusting member
628 roller
650 connection control part
802 side section
804 cross section A-A'
810 housing box
850 connection control part
852 cam
853 reference sign
854 rotation member
856 rotational axis
920 rail member
922 gear
930 outer surface
940 inner surface
954 gear
1102 side section
1104 cross section A-A'
1110 housing box
1150 connection control part
1152 rod
1154 link
1156 link member
1157 link member
1158 rotational axis
1212 surface
1214 surface

What is claimed is:

1. A housing device which houses a storage battery including a first electrical connector, the housing device comprising:
a casing capable of housing the storage battery;
a storage battery holding part that holds the storage battery in the casing, the storage battery being inserted into the storage battery holding part in a first direction; and
a drive member that (i) moves a second electrical connector in a direction that is opposite to a gravity direction and along the first direction, which is to be connected to the first electrical connector of the storage battery, relative to the first electrical connector without moving the storage battery relative to the storage battery holding part, toward the first electrical connector, when electrically connecting the first electrical connector and the second electrical connector and (ii) moves the second electrical connector in the gravity direction and along the first direction, relative to the first electrical connector without moving the storage battery relative to the storage battery holding part, in a direction away from the first electrical connector, when electrically disconnecting the first electrical connector and the second electrical connector, wherein an electrical power or an electrical signal is transmitted and received between the storage battery and the housing device through the first electrical connector and the second electrical connector.

2. The housing device according to claim 1, wherein
an opening having a size available for carrying in and out the storage battery is formed in the casing,
the casing includes a lid part that closes the opening by one of a rotational operation or a sliding operation, and
the storage battery holding part
is arranged on a surface of the lid part, facing an inside of the casing, and
defines a relative position of the lid part and the storage battery held by the storage battery holding part.

3. The housing device according to claim 2, wherein
the drive member drives the second electrical connector such that movement of the second electrical connector is ended when the lid part is closed completely.

4. The housing device according to claim 2, wherein
the drive member has a power transmission part which converts one of (i) force generated by opening or closing the lid part and (ii) gravity acting on the storage battery into a driving force of the drive member.

5. The housing device according to claim 2, further comprising:
a connector holding part which holds the second electrical connector; and
a positioning part which is arranged inside the casing and defines a position of the connector holding part while the lid part is closed completely, wherein
the positioning part positions the connector holding part such that the first electrical connector and the second electrical connector are connected electrically while the lid part is closed completely.

6. The housing device according to claim 5, wherein
the storage battery holding part includes, on a surface facing the connector holding part, an extension member which extends in an insertion direction of the storage battery through the connector holding part,
the connector holding part
moves translationally in the insertion direction of the storage battery, and
includes, on a surface opposite to a surface facing the storage battery holding part, a link member, and
the link member includes
a first link member which includes a first surface contacting the positioning part and a second surface contacting the extension member and is arranged to be rotatable about an axis located near an intersection of the first surface and the second surface, and
a second link member having one end fixed to the opposite surface of the connector holding part, and another end coupled rotatably to the first link member.

7. The housing device according to claim 5, further comprising:
a cam part which is attached to a rotational axis rotated by opening and closing of the lid part, wherein
the connector holding part is a follower of the cam part, and
a relative position of the first electrical connector and the second electrical connector is adjusted by a translational movement of the second electrical connector corresponding to a rotation of the cam part.

8. The housing device according to claim 2, wherein
the drive member moves the second electrical connector toward the first electrical connector after the lid part is closed completely.

9. The housing device according to claim 2, wherein
the drive member moves the second electrical connector in a direction away from the first electrical connector after the lid part is opened completely.

10. The housing device according to claim 2, further comprising:
an opening and closing detection part which detects opening and closing of the lid part, wherein
the drive member moves the second electrical connector when the opening and closing detection part detects the opening and closing of the lid part.

11. The housing device according to claim 1, further comprising:
a holding detection part which detects that the storage battery holding part holds the storage battery, wherein the drive member moves the second electrical connector when the holding detection part detects the holding of the storage battery.

12. The housing device according to claim 1, wherein
the storage battery is a portable storage battery.

13. The housing device according to claim 12, wherein
a weight of the portable storage battery is 3 kg or more.

14. The housing device according to claim 1, further comprising:
a charging part which charges the storage battery through the first electrical connector and the second electrical connector.

15. A standalone housing device which houses a storage battery for a vehicle external to the vehicle including a first electrical connector, the standalone housing device comprising:
a casing capable of housing the storage battery;
a storage battery holding part that holds the storage battery in the casing, the storage battery being inserted into the storage battery holding part in a first direction; and
a drive member that (i) moves a second electrical connector in a direction that is opposite to a gravity direction and along the first direction, which is to be connected to the first electrical connector of the storage battery, toward the first electrical connector, when electrically connecting the first electrical connector and the second electrical connector and (ii) moves the second electrical connector in the gravity direction and in a direction away from the first electrical connector and along the first direction, when electrically disconnecting the first electrical connector and the second electrical connector, wherein an electrical power or an electrical signal is transmitted and received between the storage battery and the housing device through the first electrical connector and the second electrical connector.

16. The standalone housing device according to claim 15, wherein
the drive member moves the second electrical connector relative to the first electrical connector without moving the storage battery relative to the storage battery holding part.

17. The housing device according to claim 1, wherein
an opening having a size available for carrying in and out the storage battery is formed in the casing,
the casing includes a lid part that closes the opening by one of a rotational operation or a sliding operation, and
the second electrical connector is provided outside of the lid part.

18. The housing device according to claim 1, wherein
an opening having a size available for carrying in and out the storage battery is formed in the casing,
the casing includes a lid part that closes the opening by one of a rotational operation or a sliding operation, and
the drive member drives the second electrical connector such that the second electrical connector moves toward the first electrical connector after the lid part is closed and locked.

* * * * *